United States Patent Office 3,393,374
Patented July 16, 1968

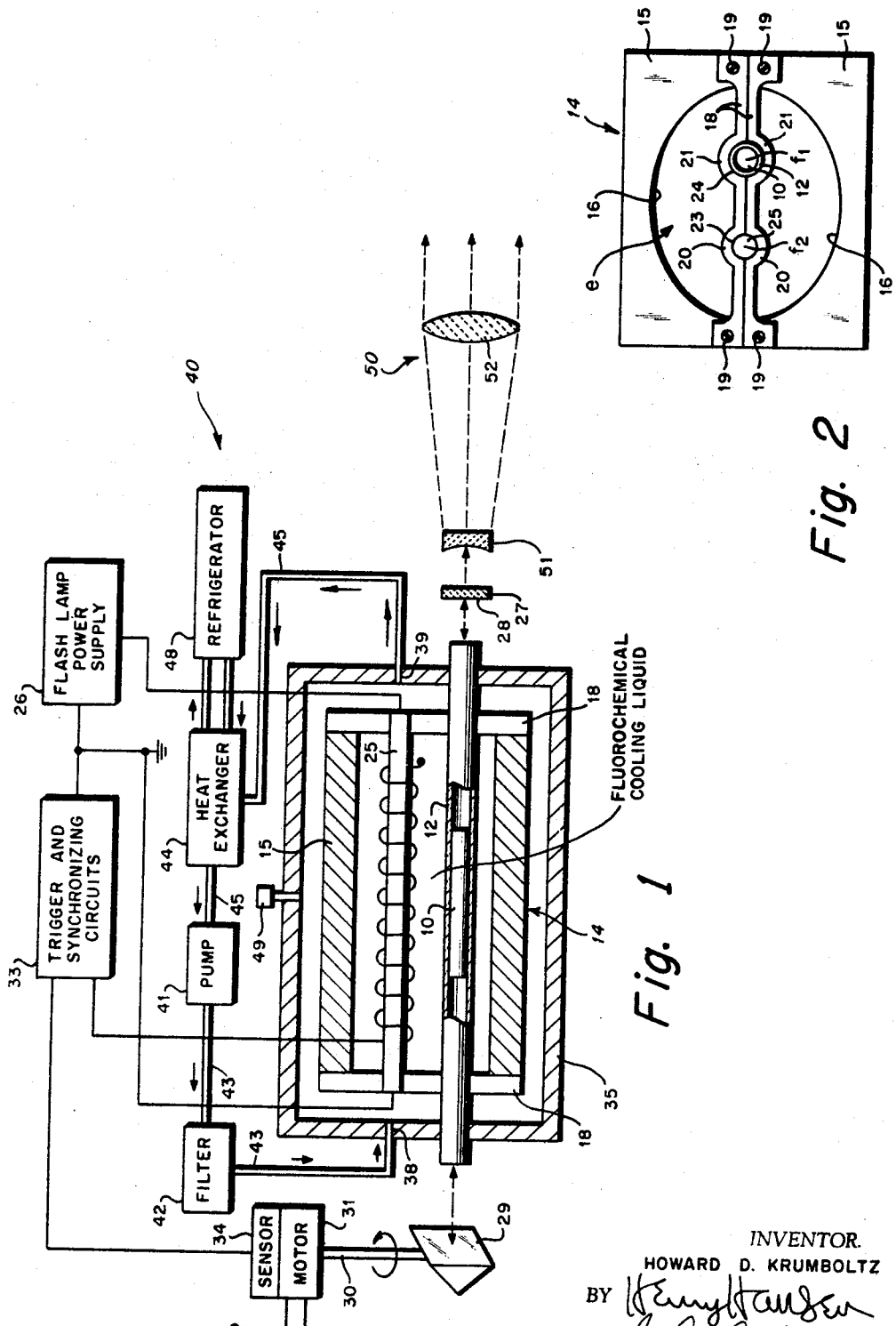

3,393,374
HIGH PRF LASER TRANSMITTER
Howard D. Krumboltz, Oreland, Pa., assignor to the United States of America as represented by the Secretary of the Navy
Filed Mar. 25, 1964, Ser. No. 354,803
1 Claim. (Cl. 331—94.5)

ABSTRACT OF THE DISCLOSURE

An optical radar transmitter including a pressure chamber within which is received an open-ended enclosure having an interior elliptical reflecting surface for reflecting light from a flash lamp located along one focus of the enclosure to a laser medium positioned along the other focus of the enclosure within a quartz tube whose ends protrude from the enclosure and into the walls of the pressure chamber. A partially reflective surface and collimating lenses are optically aligned with the laser medium adjacent one end of the tube, and a rotatable reflective prism for enabling intermittent stimulated emission of radiation is optically aligned with the laser medium adjacent the other end of the tube. A fluorochemical cooling liquid is circulated between a heat exchanger and the interior of the pressure chamber for simultaneously cooling the flash tube and the laser medium. Means are provided for synchronizing the rotational position of the prism with the actuation of the flash tube so that the tube is actuated a predetermined time before the prism is positioned to reflect energy back into the laser medium.

---

The invention described herein may be manufactured and used by or for the Government of the United States of America for governmental purposes without the payment of any royalties thereon or therefor.

The present invention relates to an optical radar system and more particularly to a high pulse repetition frequency laser transmitter.

The term laser stands for Light Amplification by Stimulated Emission of Radiation. A laser consists of a pump source, generally a xenon flash lamp; an active medium, such as ruby; and a means of coupling the energy from the flash tube to the crystal medium. This energy is absorbed by the ions of the medium and re-emitted coherently. The basic mechanism for coherent laser action is stimulated emission. Energy level transition from an excited state to a terminal state accompanied by the emission of radiation may be induced, or stimulated, by the interaction of a photon with the excited atom. Following this transition, the original photon and the emitted photon are related coherently. In a laser crystal the energy level structure of the ions is such that it is possible, by intense and rapid optical pumping, to invert the population distribution, that is, to place more of the ions in a metastable state than are in the terminal level. In this condition of inverted populations, light of the proper wave length is amplified rather than absorbed when passing through the crystal. To take advantage of this amplification it is necessary to feed the wave front back into the crystal: this is done by making the ends of the crystal parallel and silvering them. The wave front passes out of the crystal through one of the reflector coatings in the form of a beam with less than one-half degree angular spread, a duration of several hundred microseconds and from .1 to several joules total energy.

The outstanding advantages of optical frequencies—such as excellent angular resolution and high gain that can be achieved with small diameter antennas—suggested the use of the laser as a transmitter in a radar system. However, two distinct problems exist. First, the present optical radar systems achieved a very low PRF (pulse repetition frequency) at the energy levels required for laser action. For a useful radar, pulse repetition rates expressed in pulses per second are required. Second, the output of the laser is a group of randomly spaced narrow pulses lasting for several hundred microseconds. An accurate range measurement requires a narrow pulse with accurate timing.

The general purpose of this invention is to provide a laser transmitter having short-pulse and high pulse repetition rate characteristics. To attain this, the present invention contemplates a unique cooling system, and an optical pumping and reflecting arrangement utilized therewith.

An object of the present invention is the provision of an optical radar system utilizing laser techniques.

Another object is to provide an optical radar transmitter having a high pulse repetition frequency.

A further object of the present invention is the provision of an optical radar transmitter having a narrow pulse width, the pulse occurring at uniform repetition rates.

Other objects and features of the invention will become apparent to those skilled in the art as the disclosure is made in the following description of an embodiment of the invention as illustrated in the accompanying sheet of drawings in which:

FIG. 1 illustrates a block diagram of the laser transmitter; and

FIG. 2 is an end view of the elliptical cylinder of FIG. 1.

In the illustrated embodiment of the invention a laser rod or active medium 10 is appropriately mounted by cement or the like in the center of a thin walled tube 12 of a material having low light attenuation characteristics such as quartz or the like. The laser rod 10 is constructed of a material having the following properties: a broad pump level—an energy level that absorbs a broad band of incoherent white light, covering a number of frequencies or wave lengths; a metastable level—a level at which the ions can remain for a long time; and a ground level. An example of the above is a calcium-tungstate crystal which is doped slightly with neodymium, the neodymium being the laser element having the above-noted energy levels. The ends of the laser rod 10 are polished optically flat and parallel. The thin wall quartz tube 12 functions to maintain the laser rod 10 at a fixed location with respect to a pump source, discussed below, and to preclude the cooling liquid also discussed below, from entering the optical path of the laser rod 10.

The quartz tube 12 is mounted at one focus $f_1$ of an elliptical cylinder or reflector generally noted at 14. Referring to FIG. 2, cylinder 14 comprises a pair of blocks 15—15 each including a complementary inner surface 16 of semi-elliptical configuration: the complementary nature of the inner surfaces 16—16 give rise to an elliptical cavity $e$ having foci $f_1$ and $f_2$ when the blocks 15—15 are assembled. The cylinder 14 may be constructed of aluminum with the surfaces 16—16 being formed to provide a very highly reflective surface. In view of the oxidizing effect on the aluminum surface, the cylinder 14 may be constructed of brass with the surfaces 16—16 nickel plated. At each end of cylinder 14 is a pair of support members 18—18 each secured to one of the blocks 15 by screws 19 or other appropriate fasteners. Support members 18 are constructed of insulating and shock absorbing material such as Fiberglas and have semicircular portions 20 and 21 which when assembled form annular seats 23 and 24, respectively, the centers of which correspond to the foci $f_1$ and $f_2$ of ellipse $e$.

As indicated above, the quartz tube 12 is mounted at the focus $f_1$ of the ellipse $e$ by reason of the seating thereof in annular seat 24. Located at the other focus $f_2$ of the elliptical reflector 13 and seated within seat 23 is an electronic flash tube 25 which provides broad-band pumping light. An example of a flash tube which may be utilized is a xenon flash lamp which is known and used in the art. The flash tube 25 acts as the laser's stimulating source and generates white light which is reflected from the focus $f_2$ of the ellipse $e$, at which it is located, onto the other focus $f_1$. Energy is supplied to the flash tube 25 by means of a capacitor bank and power supply 26 which is interconnected with the flash tube and is of conventional design.

A multilayer dielectric reflector 27 is mounted with the surfaces 28 thereof parallel to the face of laser crystal 10: the reflector serves to furnish feedback to the laser rod 10 and serves as a transmission device to obtain laser output. Reflector 27 is constructed of a glass substrate and coated with a dielectric material for reflecting a predetermined amount of the emitted energy output of the laser—here, for example, 95 percent.

At the other end of the quartz tube 12 at a point remote from the dielectric reflector 27 a total internal reflection prism 29 is mounted on a shaft 30 of a D.C. motor 31 which rotates at a predetermined speed, for example, 15,000 r.p.m. The prism 29 provides feedback only during the time it is aligned with the dielectric reflector 27 and is so oriented that the 90° corner reflector is effective in the vertical plane, making small angular alignment errors unimportant. However, the angular alignment in the plane of rotation is critical, producing proper feedback to the laser during less than one minute of rotation.

A trigger and synchronizing circuit 33 is electrically connected to the flash tube 25 and motor 31 to synchronize the firing of the flash lamp with the position of the rotating prism 29. The triggering and synchronization may be accomplished by the use of a sensor 34 such as a magnetic pickup device which senses the position of the prism and activates the synchronizing circuit 33. The magnetic pickup is of conventional design and a detailed description thereof is believed unnecessary.

A pressure tank 35 encloses the laser rod 10, elliptical cylinder 14, flash tube 25, and has a sealed connection with quartz tube 12 which extends beyond the confines of the tank 35. An inlet port 38 and an outlet port 39 are formed in the walls of tank 35 adjacent the flash tube 25 as part of a cooling system now to be described.

A cooling system generally noted at 40 is employed for the removal of the heat generated during the operation of the aforementioned transmitter structure and employs a liquid fluorochemical which is a clear inert liquid with a low boiling point with little absorption at the laser pumping frequency and of very high dielectric strength. An example of the liquid fluorochemical coolant which may be utilized in the present invention is the FC-75, manufactured by Minnesota Mining and Manufacturing Company. A pump 41 and membrane filter 42 are serially interconnected by conduits such as 43 to the tank 35 through inlet port 38 and supplies and circulates the liquid coolant within the tank 35. The pump 41 also acts to circulate the liquid coolant through heat exchanger 44 which, in turn, is interposed and interconnected by conduits such as 45 between the outlet port 39 and the pump 41. The heat exchanger 44 includes cooling coils, not shown, about which the fluorochemical is circulated and which is a part of the refrigeration system generally indicated at 48. The refrigeration system 48 maintains the circulation of the coolant through the coils in the direction shown by the arrows. A pressure relief valve 49 is appropriately placed at the top of the container 35.

In order to collimate the output of the laser 10, a long focal length lens system 50, such as a standard telephoto lens, is interposed adjacent to the dielectric reflector 27 and in alignment with the axis of quartz tube 12. A negative lens 51 and an objective lens 52 forming the lens system 50 are located in such a manner as to have the focal points thereof located at the same point in space.

In the operation of the transmitter described above, the prism 29 is caused to rotate at a rate of approximately 15,000 r.p.m. The surfaces of the prism are cut to provide a corner reflector in the vertical plane for ease of alignment. The magnetic pickup 34 senses the position of the prism 29 and actuates the synchronizing circuit 33. At an adjustable time, 100 to 200 microseconds, before the prism is in a position to reflect energy back into the laser rod 10 the electronic flash tube 25 is fired. The light emitted from the lamp 25 is focused on the laser rod 10 by reason of the configuration of the elliptical cylinder 14. This produces an inverted population in the laser rod 10 giving rise to spontaneous emission. A portion of this spontaneous emission is reflected back and forth through the laser rod 10 by the prism 29 and the dielectric reflector 27. This energy builds up to a point of stimulated emission in a manner similar to an electronic oscillator. Since the prism is rotating at a high speed this stimulated emission can occur for only a very short time, producing a narrow pulse usually less than one microsecond. The dielectric reflector 27 being partially transmitting allows the laser output beam to be collimated by the lens system 50 which reduces beam spread.

Simultaneously with the above-mentioned operation, the circulating pump 41 causes the fluorochemical to circulate through the tank 35, the heat exchanger 44, and through the filter 42 for subsequent recirculation thereof through the tank 35.

Obviously many modifications and variations of the present invention are possible in the light of the above teachings. It is therefore to be understood that within the scope of the appended claim, the invention may be practiced otherwise than as specifically described.

What is claimed is:
1. In an optical radar transmitter the combination comprising:
 a pressure container;
 an open-ended, longitudinally extending enclosure fixed in a position within said container, the inner surface of which enclosure being energy reflective and elliptical in cross section;
 a longitudinally extending optical pump source fixed within said container in a position along one focus of said elliptical enclosure for providing optical pumping energy;
 a liquid impervious tube transparent to said pumping energy having its ends protruding through the walls of said container and fixed in a position across said container and along the other focus of said elliptical enclosure;
 a longitudinally extending laser medium responsive to said pumping energy for providing output energy and fixed within said transparent tube in a position within said elliptical enclosure;
 first reflecting means located outwardly of said laser medium adjacent one end of said tube and in optical alignment with said medium to reflect a portion of said energy output of said laser medium directed theretoward back into said laser medium and to transmit a portion of said energy output of said laser medium;
 second reflecting means located outwardly of said laser medium adjacent the other end of said tube and in optical alignment with said medium for intermittently reflecting substantially the entire energy output of said laser medium directed theretoward back into said laser medium;
 a fluorochemical cooling liquid having little absorption at the laser pumping frequency and disposed within said container in cooling adjacency both to said pump source and to said tube having said laser medium fixed therewithin;

circulating means located externally of said container;

heat exchanger means located externally of said container; and conduit means serially interconnecting said heat exchanger means, said circulating means and the interior of said container at points adjacent the ends of said enclosure for enabling circulation of said fluorochemical cooling liquid through both said container and said heat exchanger means for extraction of heat from said cooling liquid by said heat exchanger means.

References Cited

UNITED STATES PATENTS

| 2,929,922 | 3/1960 | Schawlow et al. | 331—94.5 |
| 3,210,687 | 10/1965 | Boyd et al. | 331—94.5 |
| 3,315,177 | 4/1967 | Benson | 331—94.5 |

JEWELL H. PEDERSEN, *Primary Examiner.*

W. L. SIKES, *Assistant Examiner.*